(12) United States Patent
Phillips

(10) Patent No.: US 12,667,746 B2
(45) Date of Patent: Jun. 30, 2026

(54) DOOR BREACH TRAINING SYSTEM

(71) Applicant: Darron Phillips, San Antonio, TX (US)

(72) Inventor: Darron Phillips, San Antonio, TX (US)

( * ) Notice: Subject to any disclaimer, the term of this patent is extended or adjusted under 35 U.S.C. 154(b) by 793 days.

(21) Appl. No.: 17/931,765

(22) Filed: Sep. 13, 2022

(65) Prior Publication Data

US 2023/0191178 A1 Jun. 22, 2023

Related U.S. Application Data

(60) Provisional application No. 63/243,290, filed on Sep. 13, 2021.

(51) Int. Cl.
| | |
|---|---|
| *A62C 99/00* | (2010.01) |
| *E05C 19/00* | (2006.01) |
| *G09B 9/00* | (2006.01) |
| *E06B 5/00* | (2006.01) |

(52) U.S. Cl.
CPC ........ *A62C 99/0081* (2013.01); *E05C 19/003* (2013.01); *G09B 9/003* (2013.01); *E06B 5/00* (2013.01)

(58) Field of Classification Search
None
See application file for complete search history.

(56) References Cited

U.S. PATENT DOCUMENTS

| | | | | |
|---|---|---|---|---|
| 5,556,143 | A * | 9/1996 | Robinson | .............. E05C 19/184 |
| | | | | 292/259 R |
| 6,877,988 | B2 | 4/2005 | Phillips | |
| 7,337,515 | B2 | 3/2008 | Phillips | |
| 7,676,975 | B2 | 3/2010 | Phillips | |
| 7,900,538 | B2 | 3/2011 | Phillips | |
| 8,128,408 | B2 | 3/2012 | Phillips | |
| 8,720,117 | B2 | 5/2014 | Phillips | |
| 8,919,046 | B1 | 12/2014 | Phillips | |
| 9,208,694 | B2 | 12/2015 | Phillips | |
| 9,372,048 | B1 | 6/2016 | Phillips | |
| 9,569,980 | B2 | 2/2017 | Phillips | |
| RE47,850 | E | 2/2020 | Phillips | |
| 10,724,826 | B1 | 7/2020 | Phillips | |
| 11,047,643 | B2 | 6/2021 | Phillips | |
| 2005/0058974 | A1 * | 3/2005 | Phillips | .................. G09B 19/00 |
| | | | | 434/226 |
| 2009/0208914 | A1 * | 8/2009 | Phillips | .................. G09B 19/00 |
| | | | | 434/219 |
| 2010/0109294 | A1 * | 5/2010 | Klementowicz, III | ...................... |
| | | | | G09B 19/00 |
| | | | | 280/656 |
| 2011/0223569 | A1 * | 9/2011 | Perrone | ................ G09B 19/003 |
| | | | | 434/219 |

* cited by examiner

*Primary Examiner* — James B Hull
(74) *Attorney, Agent, or Firm* — Michael D. Paul; McKinnie & Paul, PLLC

(57) ABSTRACT

A door breach training system usable within the door opening of a training structure. The system comprises a door and a frame having a hinge jamb and lock jamb. The hinge jamb is connected to the door with at least one hinge. The system has at least one mount-and-socket pair having a frame mount connected to the frame, a frame socket connected to the frame mount, a door mount connected to the door, and a door socket connected to the door. One or more pins may engage the mount-and-socket pairs to prevent the door from opening, which, during training, must be sheared or crushed.

9 Claims, 5 Drawing Sheets

DOOR BREACH TRAINING SYSTEM

CROSS REFERENCES TO RELATED APPLICATIONS

This application claims priority to and the benefit of U.S. provisional application No. 63/243,290, filed Sep. 13, 2021, which is incorporated by reference.

FEDERALLY SPONSORED RESEARCH OR DEVELOPMENT

Not applicable.

BACKGROUND OF THE INVENTION

1. Field of the Invention

The invention relates to training devices for public-safety and military personnel. More specifically, the invention is a door breach training system that allows such personnel to quickly and efficiently train for forced-entry scenarios involving fire inside the building to be breached.

2. Description of the Related Art

Both public-safety and military personnel often need to perform a forced entry into structures. A forced entry can be, and often is, a life-threatening scenario during which every second counts. Shaving seconds from the operation can mean the difference between life and death for those trapped inside a burning building. Knowledge of and training with door-breaching techniques, however slight, as well as practice and conditioning for the door breaching operation, are vital.

There are several existing training apparatuses and systems for breach training. For example, U.S. Pat. No. 8,919, 046, which is incorporated by reference, teaches an explosive breach training system that allows public safety and military personnel to quickly and efficiently train for forced-entry scenarios requiring explosive breaching. Similarly, U.S. Pat. No. 6,877,988, which is incorporated by reference, teaches a door breach training system and method of use for kinetically breaching using a breaching tool, such as a battering ram. U.S. Pat. No. 9,208,694, which is incorporated by reference, discloses a door breach training system that allows quick and efficient training for forced-entry scenarios involving burglar bar doors.

The teachings of these patents, however, are not suitable for training for situations in which firefighters want to breach a door with a possible fire inside the building. In such situations, oxygen rapidly entering an oxygen-depleted environment can cause a backdraft, which is the burning of superheated gases in the fire. Backdrafts present a serious threat to firefighters, and can surprise even firefighting veterans.

While there are some door training systems specifically for firefighters, they are generally not designed for use in actual door openings of training buildings. Rather, they are supported separately by a frame away from a structure. Moreover, there is some difficultly in making reusable but realistic training systems durable enough yet still constructed in a manner that provides opportunities for realistic training.

BRIEF SUMMARY OF THE INVENTION

The present invention provides a door breach training system usable within the door opening of an actual structure.

The system comprises a door and a frame having a hinge jamb and a lock jamb. The hinge jamb is connected to the door with at least one hinge. The invention has at least one mount-and-socket pair with a frame mount connected to the frame, a frame socket connected to the frame mount, a door mount connected to the door, and a door socket connected to the door. Pins may engage one or more mount-and-socket pair to prevent the door from opening.

DETAILED DESCRIPTION OF VARIOUS EMBODIMENTS

Figure 1:
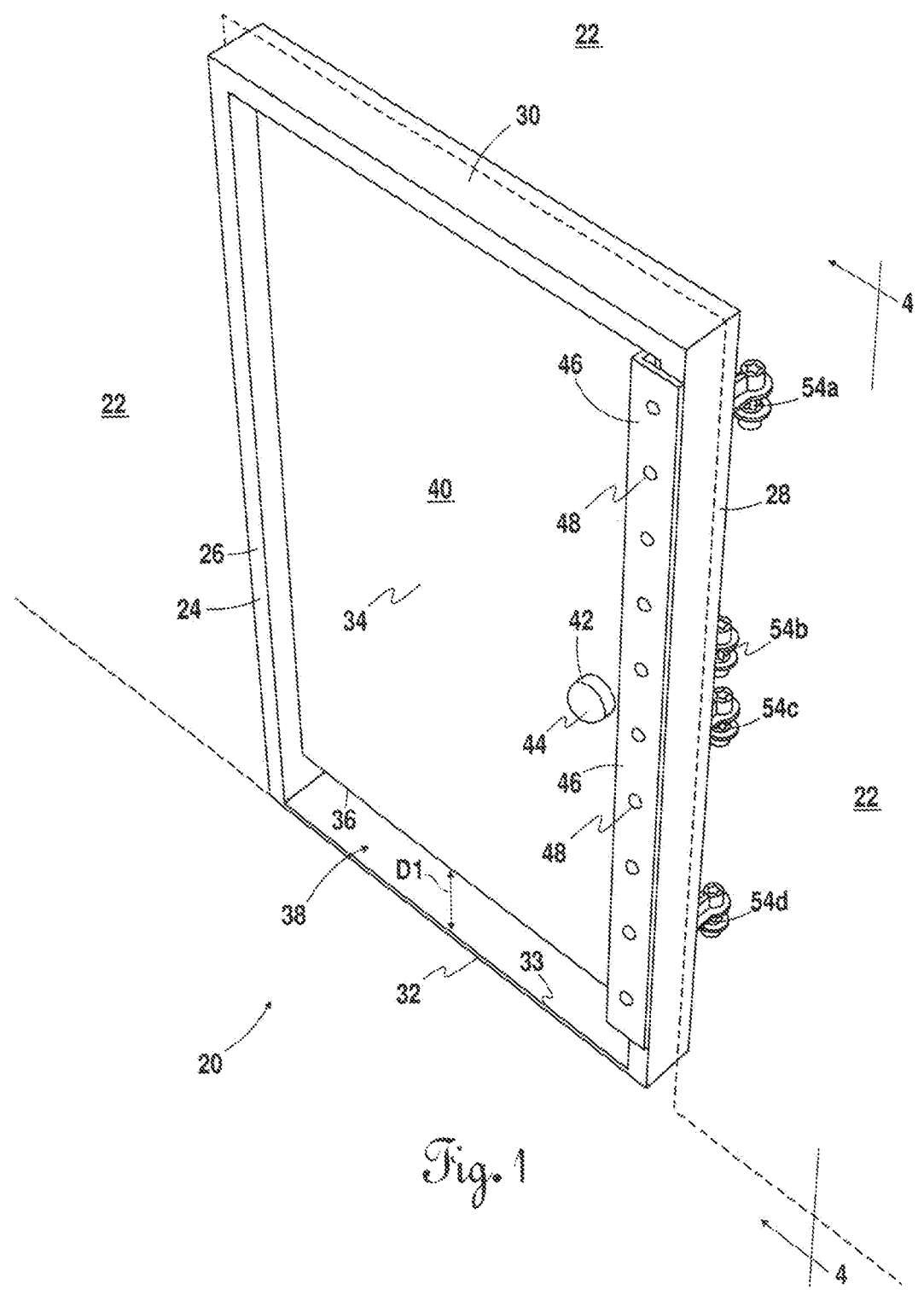
FIG. 1 shows a first embodiment of a door breach training system.

As shown in FIG. 1, a first embodiment 20 of the invention is within an opening through a wall 22 of, and connected to, a structure. The embodiment 20 includes a frame 24 comprising a hinge jamb 26, a lock jamb 28, and a header 30 connected (e.g., welded) to the jambs 26, 28. The jambs 26, 28 and header 30 are made of steel tubing having a rectangular cross section. A sill 32 is connected to the jambs 26, 28 opposite the header 30 and made of a rectangular, ⅜-inch thick steel plate. Edges 33 of the sill 32 adjacent the doorway are beveled. Together, the jambs 26, 28, header 30, and sill 32 define a doorway with a rectangular cross section that partially intersects the wall opening.

A door 34 partially occupies the doorway. In contrast to the gap size at the bottom of a typical exterior door, which is almost nonexistent, the door 34 has a bottom 36 spaced a distance D1 from the sill 32 forming a gap 38. D1 is sufficient to allow a standard firehose in use (e.g., carrying water) to puss through the gap 38 without getting stuck. In this embodiment, D1 is 7 inches. One side of the door 34 has a rectangular steel plate 40. The door 34 also includes a solid metal dummy knob 42 in about the same position as would be expected of a knob installed in a conventional exterior door. The knob 42 has a hemispherical end 44.

An elongate solid steel member 46 is connected to the lock jamb 28. The steel member 46 has an L-shaped cross section and partially extends into the doorway away from the lock jamb 28. The steel member 46 is connected to the lock jamb 28 with plug welds 48.

Figure 2:
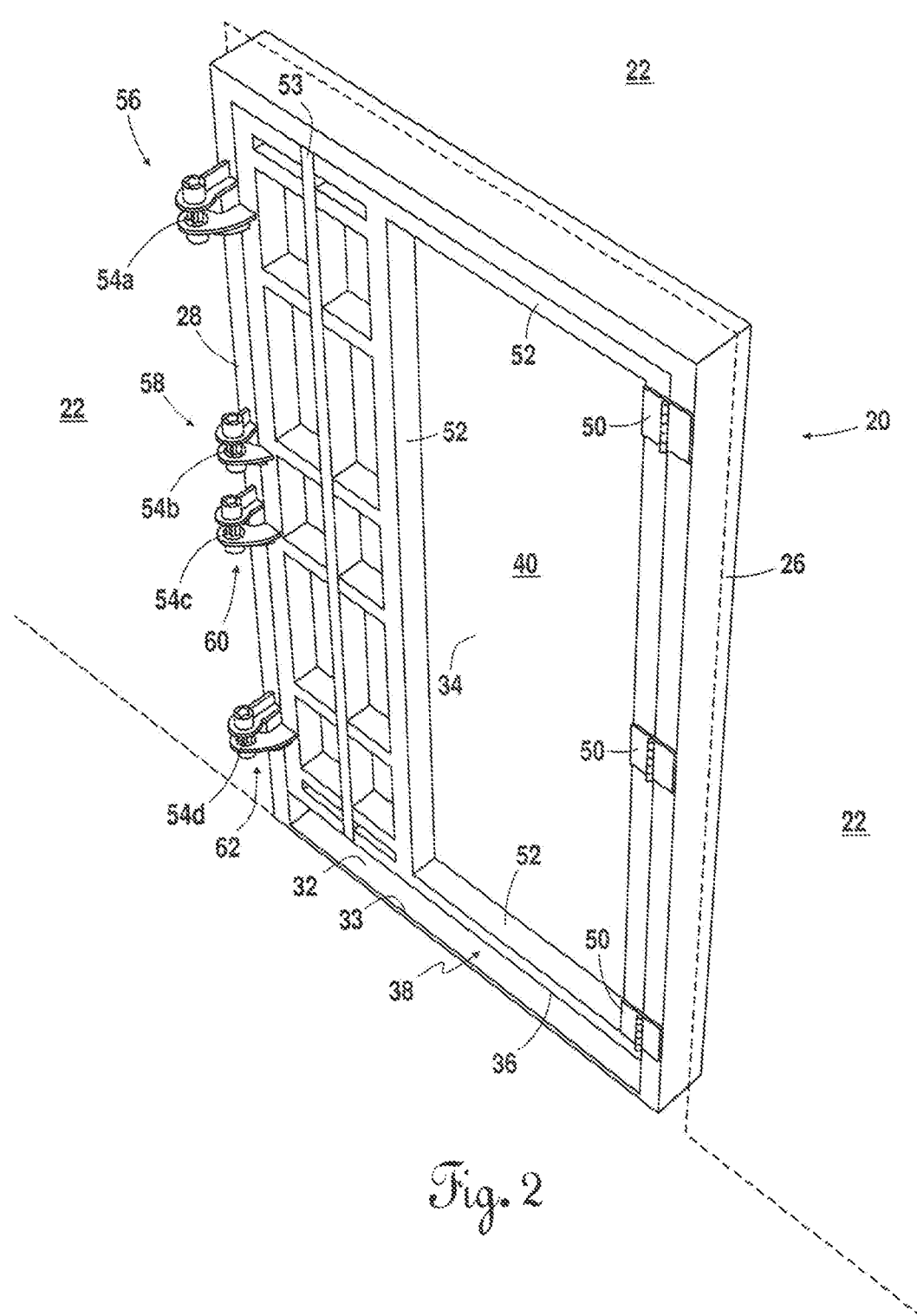
FIG. 2 is a reverse view of the embodiment shown in FIG. 1.

As shown in FIG. 2, the door 34 has a hinged side connected to the hinge jamb 26 with hinges 50. The door 34 includes connected steel tubing members 52, to which is connected the steel plate 40. The door 34 further includes a solid steel rib 53 extending the length of the door (e.g., between its top and bottom) which rib 53 provide rigidity. The lock side of the door 34 is connected to the lock jamb 28 by pins 54a-54d engaged with first through fourth mount-and-socket pairs 56, 58, 60, 62.

Figure 3:
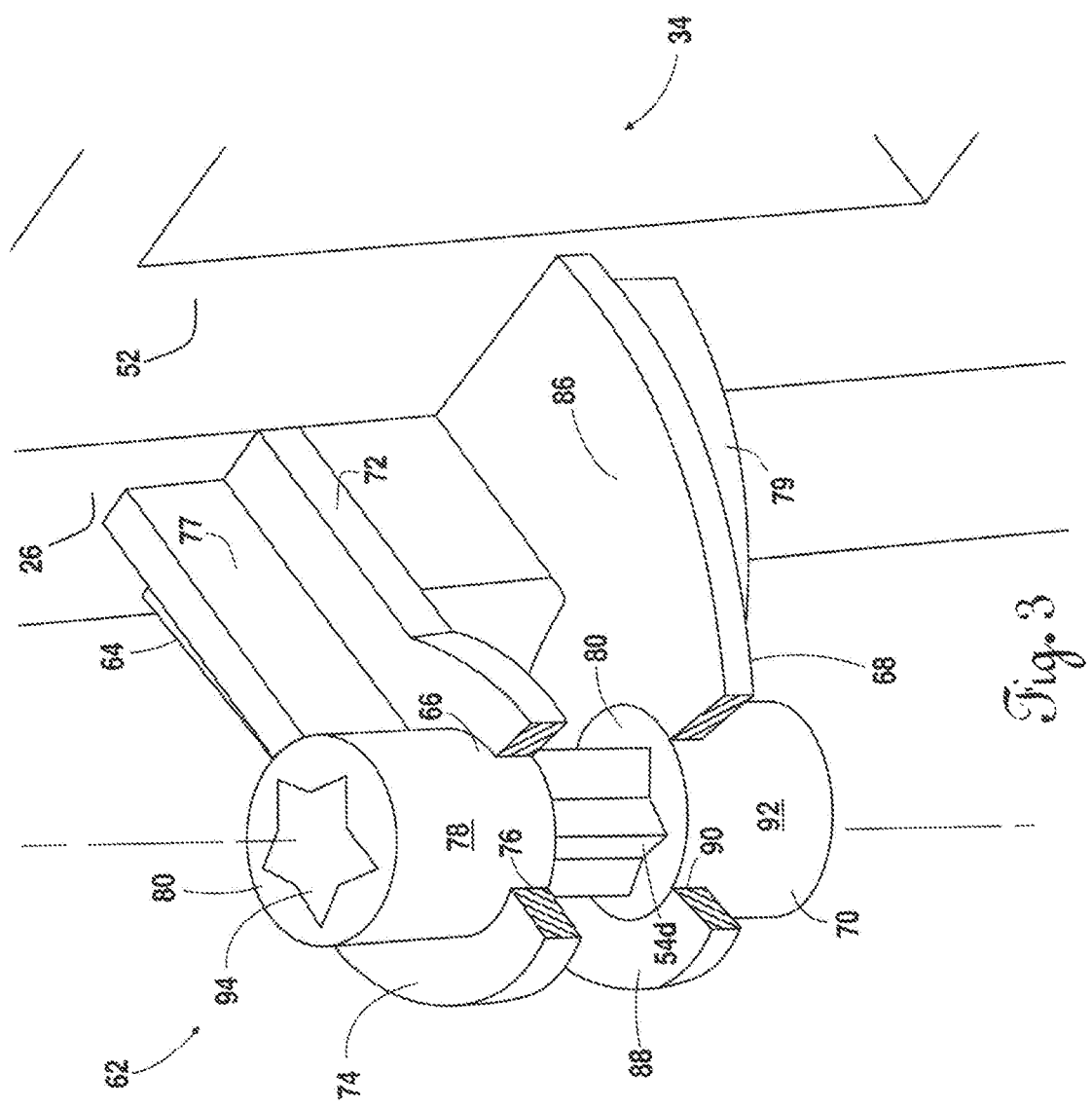
FIG. 3 shows an enlarged view of the fourth mount-and-socket pair of FIG. 2.

As shown in FIG. 3, the fourth mount-and-socket pair 62 includes a frame mount 64, a frame socket 66, a door mount 68, and a door socket 70. The frame mount 64 is a steel plate with a rectangular portion 72 connected to the lock jamb 26, and an annular portion 74 adjacent to the rectangular portion 72 and distal from the lock jamb 26. The annular portion 74 has a cylindrical inner surface 76. A gusset 77 made from a steel plate is connected (e.g., welded) to the lock jamb 26, frame mount 64, and frame socket 66. A gusset 79 made from a steel plate is connected to the lock side of the door 34, the door mount 68, and the door socket 70.

The frame socket 66 has a cylindrical outer surface 78 extending between identical base surfaces 80. Part of the cylindrical surface 78 is connected to and adjacent the inner surface 76. The frame socket 66 has inner surfaces extending between its base surfaces forming a hollow with a star-shaped cross-section between the ends. The center of the hollow intersects a cylindrical axis 81 of the frame socket 66.

The door mount 68 is similarly constructed to the frame socket 66, having a curved portion 86 connected to a tubular member 52 and an annular portion 88 adjacent to the curved portion 86 and distal from the tubular member 52. The annular portion 88 has a cylindrical inner surface 90. The door socket 70 has a cylindrical outer surface 92 and inner surfaces extending between its base surfaces 80 forming a hollow with a regular star-shaped cross-section between the base surfaces 80. The center of the hollow intersects a cylindrical axis 83 of the socket 70. When the door 34 is fully closed, the cylindrical axis 81 of the frame socket 66 and the cylindrical axis 83 of the door socket 70 intersect.

The pin 54d has a regular-star-shaped cross section matching the size and shape of the hollows of the sockets 66, 70, and two ends 94. 96. An end 94 of the pin 54d is flush with the base surface 80 of the frame socket 66. The other end is flush with a base surface of the door socket 70. The pin 54d has a shear strength within a known range.

Figure 4:
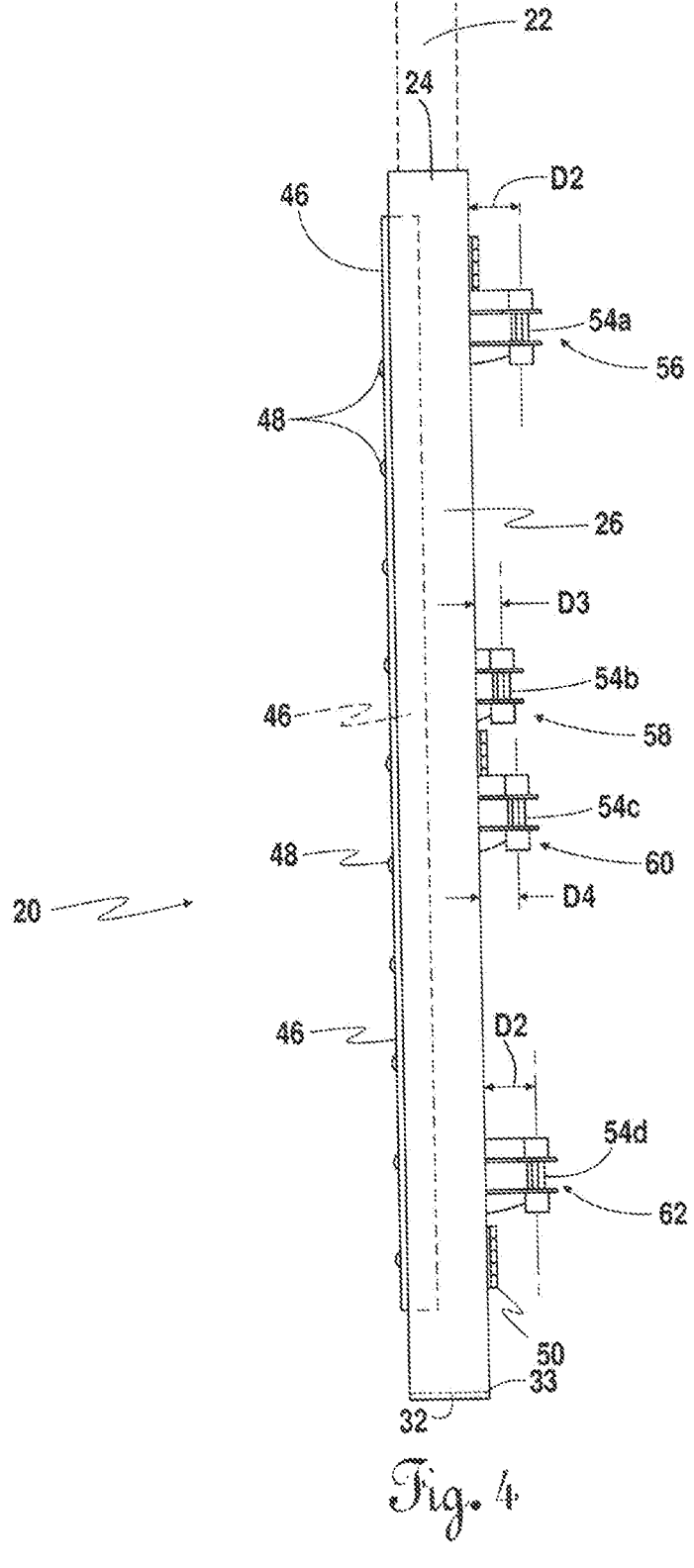
FIG. 4 shows a side view of the first embodiment.

As shown in FIG. 4, the second and third mount-and-socket pairs 58, 60 are similarly constructed to the fourth mount-and-socket pair 62, but the length of their respective rectangular portions (of the frame mounts) and curved portions (of the door mounts) vary to space the pins 54b, 54c at different distances from the lock jamb 26. The first mount-and-socket pair 56 is identical to the fourth mount-and-socket pair 62. The longitudinal axis of each pin 54a-54d is vertical and intersects the cylindrical axes of the associated frame and door sockets, but the distances between each pin 54a-54d and the lock, jamb 26 are not all the same. Of the four pins 54a-54d, the second pin 54b is closest to and spaced a distance D3 from the lock jamb 26. The third pin 54c is next closest to and spaced a distance D4 from the lock jamb 26. The first and fourth pins 54a, 54d are furthest from and spaced the same distance D2 from the lock jamb 26. Therefore, D2>D4>D3.

Figure 5:
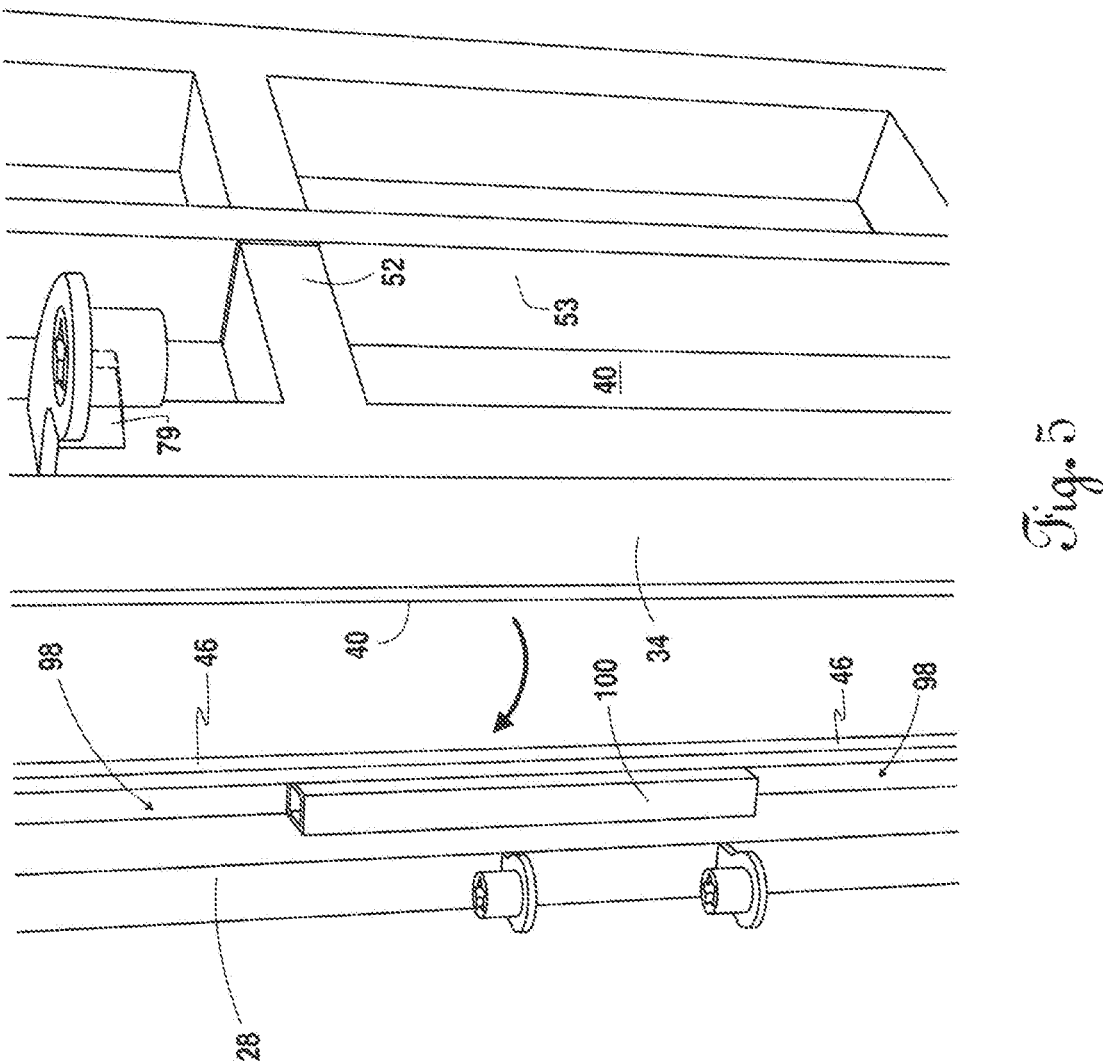
FIG. 5 shows a partial view of the first embodiment with the door not fully closed.

As shown in FIG. 5, the L-shaped elongate member 46 and the lock jamb 28 together form a rectangular channel 98 within the doorway. A doorstop 100 occupies part of the channel 98. The doorstop 100 is made from steel tubing having a width sized to fit within the channel 98 and be held there by frictional engagement with the lock jamb 28 and L-shaped member 46. The door 34 is closable in the direction of the bold arrow. When fully closed, the door 34, and in particular the steel plate 40, contacts the doorstop 100.

Referring to FIG. 1, to use the embodiment 20, the frame 24 is mounted to a structure within a wall opening. The embodiment 20 is placed in the configuration shown in FIG. 1, with pins 54a-54d engaged with each mount-and-socket pair 56, 58, 60, 62, respectively. So configured, the embodiment 20 is a three-staged training system, requiring a force to first shear the second pin 54b, then the third pin 54c, and then the first and fourth pins 54a, 54d.

A typical firefighting door breach requires the firefighter to "shock, gap, and pry" the door. To "shock," a blunt force is applied to the door 34 on the "knob" side near the second pin 54b, typically using the blunt end of an axe. The blunt force is applied repeatedly to crush the second pin 54b, thereby simulating breaching of a lock mechanism of a typical door. Some of the inwardly exerted force will be distributed to the other pins 54a, 54c, 54d, with less force being transferred to the pins further away from the point of force application. That distributed force, however, is not sufficient to shear or otherwise break those pins.

"Gapping" lets oxygen slowly into the structure to avoid a backdraft. To "gap" a door, the prying end of a breaching tool (e.g., a Halligan) is forcibly inserted between the door 34 and doorstop 100 (see FIG. 5). The tool is then manipulated to exert an inward force on the door 34 in excess of the shear strength of the third pin 54c. Although some of the inwardly exerted force will be distributed to the other pins 54a, 54d, the amount of that force will be relatively small and not sufficient to shear those pins given their distance from the point of force application.

After simulating "gapping," the trainee pries the door 34 by exerting an inward force near the first and fourth pins 54a, 54d. A successful breach requires the exerted force to be sufficient to shear those pins and release the door 54.

Referring to FIG. 5, during a breach attempt—or more likely over a number breaching attempts—the doorstop 100 may become damaged, particularly because of the prying action described with respect to "gapping." The doorstop 100 may then be quickly removed from the channel 98 and replaced with a new doorstop. In some cases, the orientation may simply be reversed and the doorstop 100 reinserted into the channel 98. That the L-shaped member 46 is plug-welded to the lock jamb 28 helps doorstop 100 absorb most of any outward forced caused by the breaching action without deforming the elongate member 46. Further, the rib 53 provides rigidity to the door 34, which inhibits deformation of the door 34 as the system is used repeatedly.

Referring to FIG. 1, the embodiment provides a number of safety features to assist in training. First, the door gap 38 inhibits a firehose from getting caught between the door 34 and the sill 32, which could lead to injury from falling or tripping during a breach training attempt. Second, the sill 32 has a small thickness, and thereby presents a lower tripping threat for trainees during a simulated entry. Moreover, the beveled edges 33 of the sill 32 inhibit the firehose from tearing or reaping as the trainee passes through the doorway.

Third, the hemispherical shape of the dummy knob 42 helps prevent injury to the trainee during breaching near the second pin 54b or third pin 54c. Incorrect technique can result in injury from an accidental strike on the knob or lock mechanism of a door. In the training situation provided by the embodiment 20, a strike (usually unintentional) of the dummy knob 42 will be deflected due to its rugged build and hemispherical shape, thereby dispersing the impact force in a manner than lessens the injury potential to the trainee.

Importantly, the foregoing describes use of the invention during a successful training breach. But use of the invention is the act of training itself, and thus also incorporates unsuccessful attempted breaches. Moreover, the shear strengths of pins 54a-54d may be the same, different, or chosen for the desired training scenario. Alternatively, use of the invention does not require that all mount-and-socket pairs be pinned at the outset.

The present invention is described with reference to a specific system, and those skilled in the an will recognize that alternative constructions of such a system can be used in carrying out the present invention. For example, rather than frictional engagement, the doorstop 100 may be fastened to the frame 24 or the L-shape member 46 and may be made of other material. The doorstop 100 may extend the length of the channel 98 or only occupy one or more portions of the channel 98. Although the described embodiment is installed within the opening of wall of a structure, the system may be implemented in stand-alone fashion. The tapered pins described in U.S. Pat. No. 6,877,988 may be used, in which case the door and frame sockets or each pair will not be identical because the hollows of each will taper to accommodate the shape of the pins. Other aspects, features, and advantages of the present invention may be obtained from a study of this disclosure and the drawings, along with the appended claims.

The invention claimed is:

1. A door breach training system comprising:

a frame at least partially defining a doorway with a bottom, the frame having a lock jamb and a hinge jamb;

a door having a bottom, a lock side, and a hinged side, the hinged side connected to the hinge jamb with at least one hinge;

at least one mount-and-socket pair, each mount-and-socket pair connected to the frame and the door;

an elongate member connected to the lock jamb, the elongate member having an L-shaped cross section and extending partially into the doorway to define a channel adjacent to the lock jamb within the doorway; and a doorstop occupying at least part of the channel, wherein when fully closed, the lock side of the door is in contact with the doorstop.

2. The system of claim 1 wherein each of the at least one mount-and-socket pair comprises a frame socket connected to the frame mount, and a door socket connected to the door.

3. The system of claim 2 wherein each of the at least one mount-and-socket pair comprises a frame mount connecting the frame socket to the lock jamb and a door mount connecting the door socket to the door.

4. The system of claim 2 further comprising at least one pin in at least part of the frame socket and in at least part of the door socket.

5. The system of claim 1 wherein the at least one mount-and-socket pair has a plurality of mount-and-socket pairs and further comprising a plurality of pins engaged with the plurality of mount-and-socket pairs and spaced a plurality of distances from the lock jamb.

6. The system of claim 1 wherein the door further comprises a dummy knob with a hemispherical end.

7. The system of claim 1 further comprising the doorstop comprising a steel tubing having a width sized to fit within the channel and be held there by frictional engagement between the lock jamb and the elongate member.

8. The system of claim 1 wherein the bottom of the door is at least one inch from the bottom of the doorway.

9. The system of claim 1 wherein the door comprises at least one tubular member and a rib extending between the top and bottom.

* * * * *